(12) United States Patent
McGill

(10) Patent No.: US 6,616,323 B2
(45) Date of Patent: Sep. 9, 2003

(54) FOOD BLENDING APPARATUS

(75) Inventor: Shane R. McGill, West Malling (GB)

(73) Assignee: McGill Technology Limited, West Malling (GB)

( * ) Notice: Subject to any disclaimer, the term of this patent is extended or adjusted under 35 U.S.C. 154(b) by 0 days.

(21) Appl. No.: 09/970,024

(22) Filed: Oct. 4, 2001

(65) Prior Publication Data

US 2002/0048215 A1 Apr. 25, 2002

(30) Foreign Application Priority Data

Oct. 4, 2000 (GB) ............................................. 0024304

(51) Int. Cl.⁷ .................................................. B01F 7/16
(52) U.S. Cl. ...................... 366/201; 366/249; 366/255; 366/289; 366/308
(58) Field of Search ................................ 366/249, 255, 366/289, 308, 332, 256, 347, 201, 203

(56) References Cited

U.S. PATENT DOCUMENTS

| | | | | |
|---|---|---|---|---|
| 292,590 A | * | 1/1884 | Schafhaus | 366/308 |
| 697,579 A | * | 4/1902 | Wehmeier et al. | 366/308 |
| 1,111,374 A | * | 9/1914 | Goddard | 366/308 |
| 1,216,722 A | * | 2/1917 | Patten | 366/249 |
| 1,412,401 A | * | 4/1922 | Gotfredsen | 366/347 |
| 2,008,106 A | * | 7/1935 | Lawerence | 366/197 |
| 2,662,754 A | * | 12/1953 | Sharp | 366/197 |
| 3,285,584 A | * | 11/1966 | Goldfarb | 366/252 |
| 4,408,690 A | * | 10/1983 | Ferrero | 366/155.1 |
| 4,561,782 A | * | 12/1985 | Jacobsen et al. | 366/347 |
| 5,150,967 A | * | 9/1992 | Neilson et al. | 366/289 |
| 5,192,131 A | * | 3/1993 | Hatfield | 366/343 |
| 6,068,875 A | * | 5/2000 | Miller et al. | 366/347 |
| 6,071,006 A | * | 6/2000 | Hochstein et al. | 366/347 |
| 6,283,627 B1 | * | 9/2001 | Fromm | 366/332 |
| 6,338,569 B1 | * | 1/2002 | McGill | 366/347 |

FOREIGN PATENT DOCUMENTS

| | | | |
|---|---|---|---|
| WO | WO 99/21466 | * | 5/1999 |
| WO | WO 00/12203 | * | 3/2000 |
| WO | WO 00/49930 | * | 8/2000 |

* cited by examiner

Primary Examiner—Tony G. Soohoo
(74) Attorney, Agent, or Firm—Nixon & Vanderhye

(57) ABSTRACT

The invention concerns apparatus for blending and dispensing food products within a container, which may be disposable. The container 1 is charged with food product through its upper opening which is then sealed with a closure member 2. The closure member 2 may carry a blender 7 when it closes the container. Alternatively, the blender may be admitted through the closure member 2 when blending is required. In each case the blender is moveable up and down relative to the container to blend the product in the container.

15 Claims, 4 Drawing Sheets

FOOD BLENDING APPARATUS

This invention relates to food blending apparatus and to a method of blending food within a container. The invention has particular application to milkshakes but can be used with other food products which need to be blended, particularly those which need to be dispensed ready for consumption in retail premises.

In earlier patent specification PCT/CG98/03193 there is described food blending apparatus and a method of blending food within a container which may form a starting point for the present invention. Several aspects of the method and apparatus are common to the present application which seeks to provide an improved, modified apparatus by which the product is to be blended.

According to one aspect the invention provides a method of blending food product in a container wherein the container is charged with the product through an opening at the upper end of the container, the opening is closed by a closure member having blender access means, the container is transported when charged with product to a blending location, a blender, extending into product in the container from the closure member and through the access means, is drivingly connected to blender drive means, and the drive means is actuated to operate the blender whereby blending product in the container and, after blending, the product is removed from the container for consumption through said upper opening.

According to another aspect of the invention food blending apparatus is provided which comprises a container having an upper opening for admitting food product into the container, a closure member for the upper opening, and blending means for blending products within the container, the blending means being drivingly connectable to drive means, the blending means being associated with the closure member and extending downwardly into the container from said closure member towards the opposite end of the container, the blending means including a rotatable shaft having connection means for releasably connecting the drive means for driving engagement with the shaft, and the shaft carrying a blending element for blending product in the container upon rotation of the shaft.

According to a further aspect the invention provides a container for use in the food blending apparatus of the invention comprising an upper opening for admitting food product into the container, a closure for the upper opening, and blending means for blending product within the container, the blending means being drivingly connectable to external drive means, the blending means being associated with the closure member and extending downwardly into the container from said closure member towards the opposite end of the container, the blending means including a rotatable shaft having connection means for releasably connecting the drive means with the shaft, and the shaft carrying a blending element for blending product in the container during rotation of the shaft.

preferably, the mixing means is carried towards the lower end of the shaft. Additional mixing means may be located along the shaft from said lower end, either spaced along the shaft, or in a spirally-arranged array.

The shaft may be reciprocally moveable in its axial direction relative to the container and relative to the closure member. This may be by a reciprocal movement of the drive means.

The closure member preferably includes a central aperture for receiving the shaft, there being bearing means between the shaft and said aperture.

Instead of the shaft being reciprocally moveable, or in addition, the shaft may extend a distance down the container so that the mixing means operates at a level in the container sufficient to mix product. The product may be relatively viscous and/or in layers in the container.

The drive means may be connected for driving the shaft by releasable connection means. The drive means may include a portion which is located within a central cylindrical opening in the shaft and the connection may be made by expanding said portion into engagement with the walls of said opening.

A seal is normally provided for sealing over the opening for the drive means in the closure member, the seal being applied to seal the contents during transit of a filled container, and the seal being removed to permit a blending operation.

A further opening may be provided in the closure member for accessing the contents through a straw or by other means, after blending.

Further features of the invention will appear from the following description of an embodiment of the invention given by way of example only with reference to the drawings in which.

Figure 1:
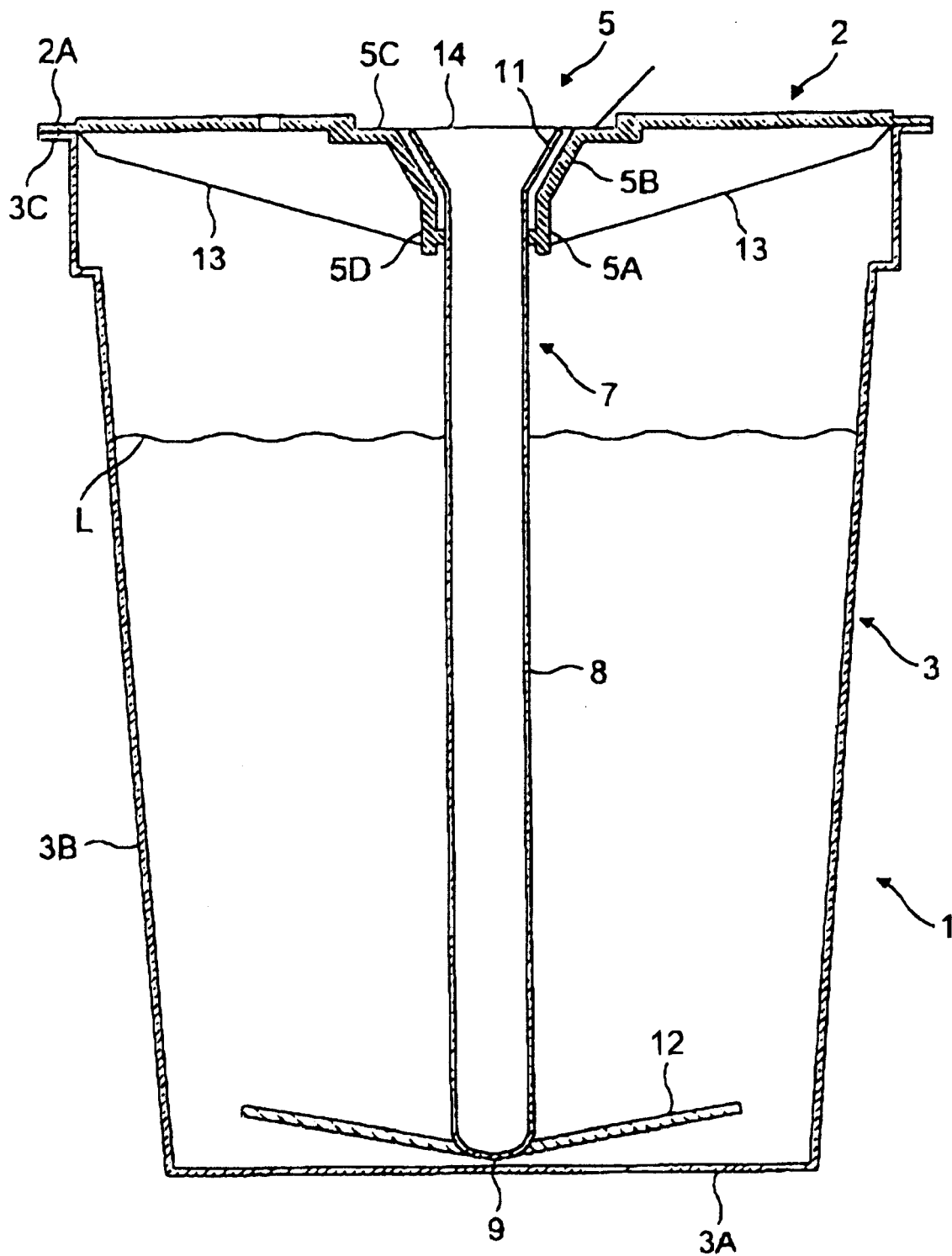
FIG. 1 is a vertical section through a container assembly.

Referring to the drawings there is shown a container 1 for use in blending apparatus which comprises a body portion 3 consisting of a plastics vessel in the shape of a beaker having a base 3A, upwardly diverging, circular cross section side wall 3B and an upper edge 3C of the container. The container is nestable with other containers, when empty, by location of the base through the upper opening of another container.

The container body or vessel 3 is provided with a closure member 2 constituting a lid arranged to fit over the upper end of the body 3 and to close the opening at the top of the body. The lid is generally circular having an outer portion 2A which fits over the upper end 3C of the body to be sealingly engaged over the opening. This may be by clip arrangement, by heat sealing, or by any other suitable means for securing the lid 2 on the body 3.

At the centre of the lid 2 is formed an opening 5 for receiving a rotatable blending element or impeller 7 which is supported by the lid 2 for rotation relative thereto about the central axis of the container. Instead the opening may be arranged to receive a collar (not shown) fitting the opening 5 and having an inwardly projecting portion to engage the shaft 8 and to rotate with shaft and to be drivingly connected to the drive means.

The opening 5 is formed with an inner cylindrical portion 5A extending into upwardly and outwardly directed tapered portion 5B and an annular portion 5C.

The blending element 7 comprises a hollow cylindrical body or shaft 8 closed at its lower end 9 and having at its upper end an outwardly diverging portion 11 of corresponding shape to the portion 5B of the opening 5 whereby, in the position shown in FIG. 1, the element 7 is at its lowest point in the container 3 in which the element is prevented from further downward movement relative to the container.

Figure 2:
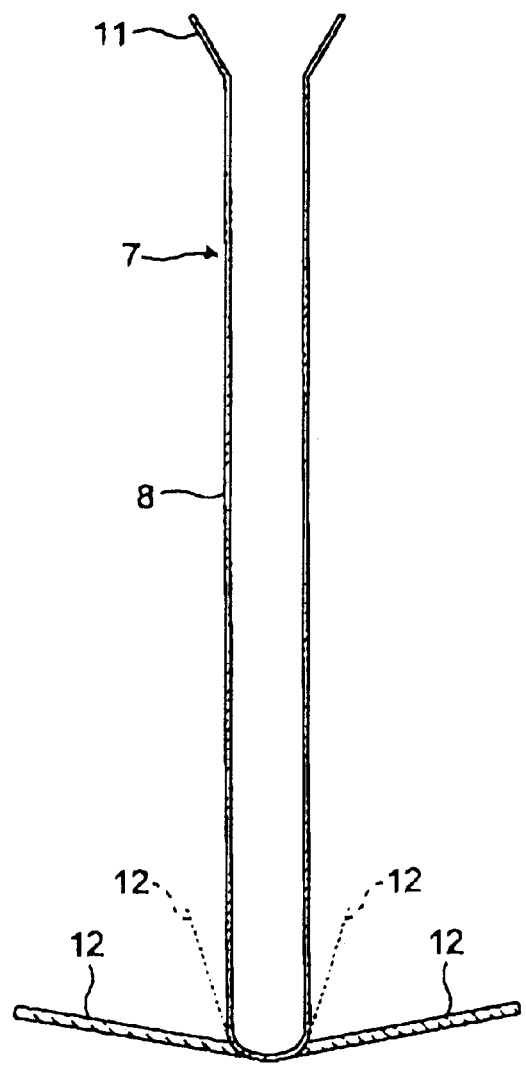
FIG. 2 is a section corresponding to that of FIG. 1 of the blending means of the assembly of FIG. 1.
Figure 3:
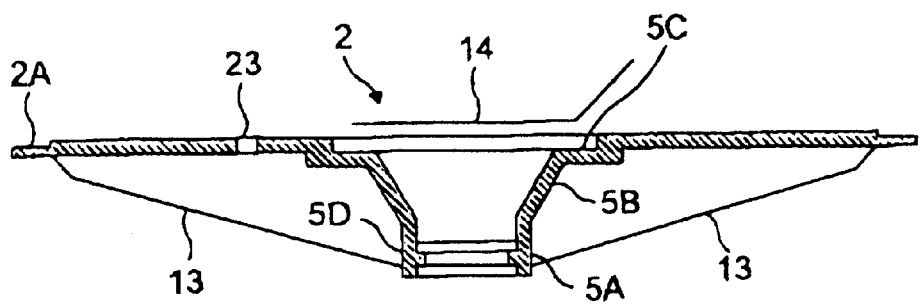
FIG. 3 is a section corresponding to that of FIG. 1 of the closure member of the assembly.
Figure 4:
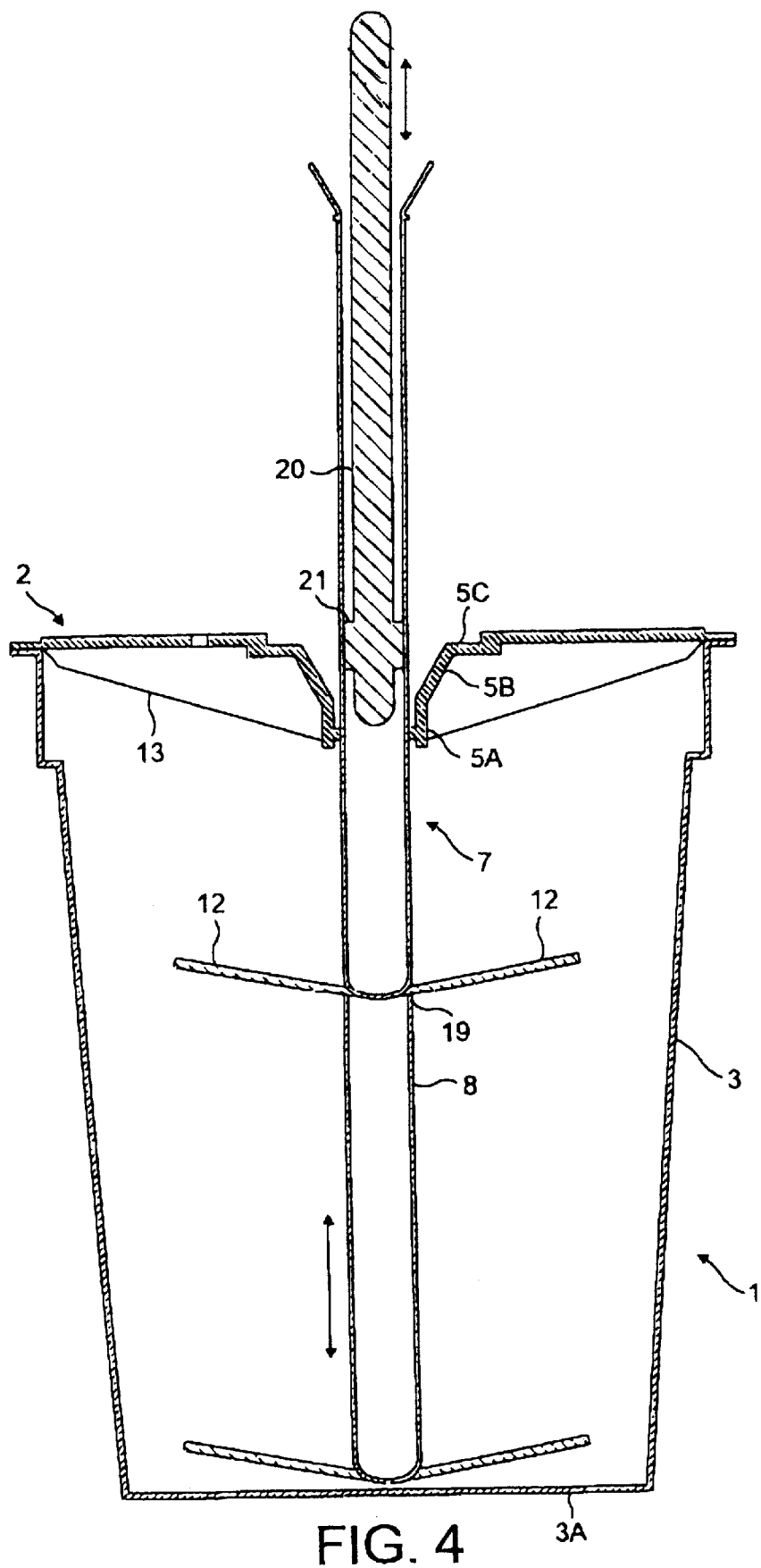
FIG. 4 is a vertical section corresponding to that of FIG. 1 showing the assembly during a blending operation.

At the lower end of the element 3 there is carried on the cylindrical shaft 8 impeller blades 12 shaped so that on rotation of the shaft 8 about its axis the blades 12 blend and mix a product within the container 1. Preferably the blades 12 pivot or bend about their inner ends to lie adjacent the outer surface of the shaft 8, as seen in FIG. 2, so that the blending element 1 can enter the container through the opening. Conveniently the outer surface of the shaft has recesses in which the blades 12 are received to lie flush with the outer surface. Alternatively the blades extend radially outwards to match the maximum diameter of the shaft 8, the shaft being narrowed at its lower end.

In the cylindrical portion 5A of the opening 5 there is provided sealing means 5D which bears against the outer surface of the shaft 8 to seal the shaft and prevent the passage of material into and out of the container 1 during blending.

The lid 2 is formed with radial strengthening ribs 13 extending between the portions 5A and 5B and the outer edge of the lid 2.

In use of the container 1 the container body 3 is charged with material up to the level L which, as shown in FIG. 1, is spaced below the upper end of the body 3 to allow for expansion of the product during blending. Alternatively, the product may be filled to a higher or lower level than that shown. The product, upon blending, usually becomes aerated and expands in volume. Filling is by conventional filling techniques with the lid 2 and blending element 7 not present. After filling the lid 2 is located over the upper opening of the body 3 and fixed in position, as described. Alternatively the product enters the container through the opening 5 after the lid has been applied. The blending element 7 may then be admitted into the opening 5 until fully inserted towards the base 3A of the body 3. Alternatively the blending element 7 may be entered into the container when blending is required. After filling, and location of the lid 2, the opening 5 is sealed by a sealing diaphragm 14 sealed into the annular recess 5C of the opening 5. The seal 14 seals the filled container during transit after filling.

In another arrangement the element 7 enters the container mounted on the drive shaft when blending is to be undertaken.

Figure 5:
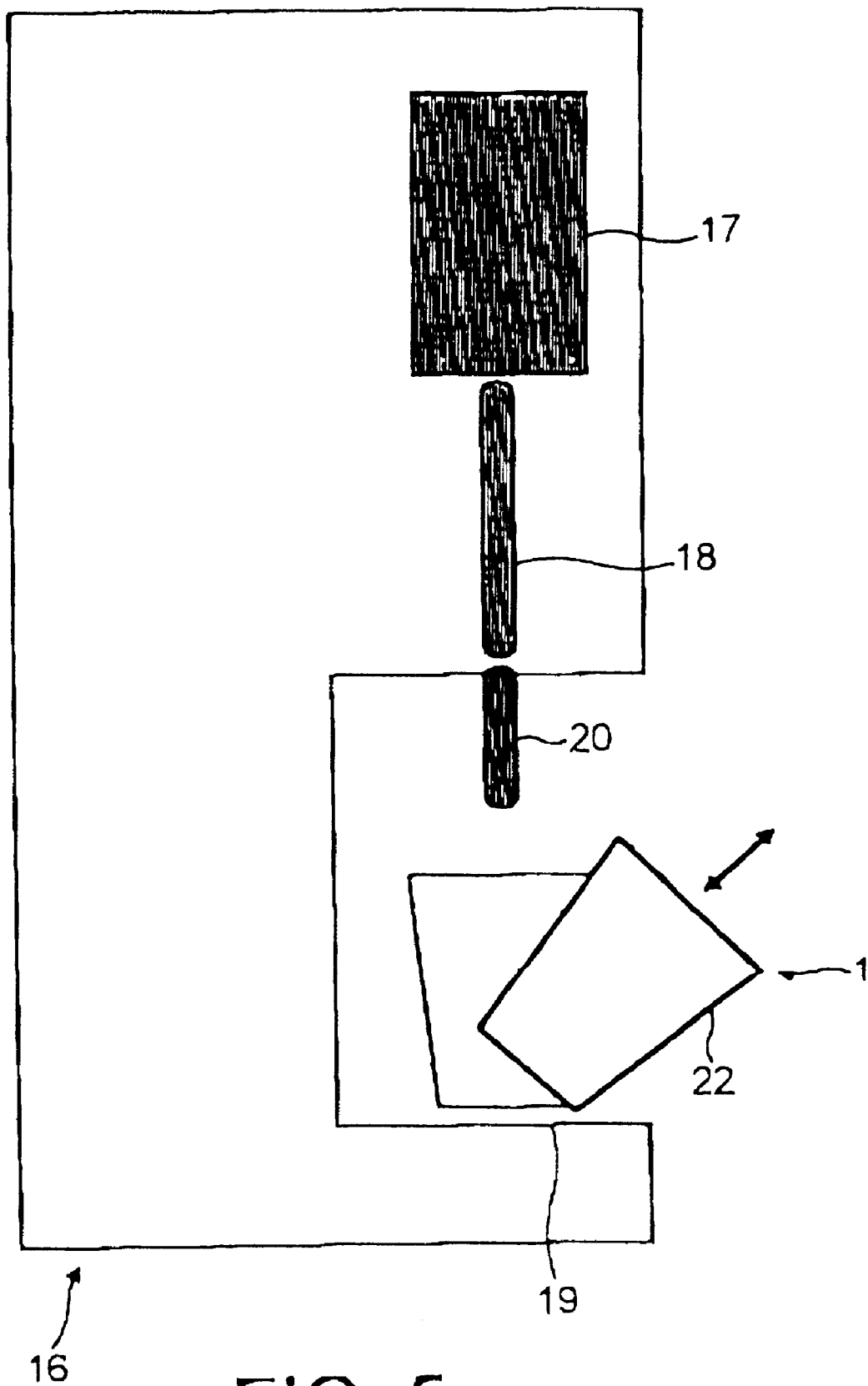
FIG. 5 is a side elevation of blending apparatus using the container assembly.

After the container 1 is filled and sealed it may be cooled to freeze or chill the contents of the container. Alternatively the filled container may be transported at ambient temperature. When it is required to blend and dispense the product in the container the container is taken to a dispensing machine 16 (FIG. 5). The machine houses a drive motor 17 having an output shaft 18. Below the output shaft 18 is a location for the container 1 which defines a support surface 19 for the container during blending. The seating 19 carries a shaped receiver 22 in which the container 1 is placed and supported for blending purposes.

The receiver 22 may be hinged about its forward edge so as to be pivoted and moveable from the upright position in which the container 1 may be located into the support. The container 1 may be clamped in relation to a support surface 19 during a blending operation, for example by engagement of a clamp (not shown) with the top of the container. The support 22 may be heated to heat the container contents to assist the blending operation. The support 22 may be in the form of a removable jug or a fixed housing.

The drive shaft 18 has at its lower end a vertically moveable drive member 20 sized and arranged to locate within the shaft 8. When the container 1 has been located on the machine 16 the member 20 is entered into the shaft 8 and is secured relative thereto. In one arrangement this is by a portion 21 carried on the member 20 towards its lower end which is arranged to expand outwards to engage with the lock with respect to the inner walls of the shaft 8. This may be at any position along the shaft 8 but is preferably intermediate its ends. Operation of the motor 17 gives rise to rotation of the drive shaft 18 and of the member 20 which causes the blending element 7 to rotate about its axis and blend product within the container. During such rotation the member 20 may be reciprocated up and down whereby the element 7 moves within the container raising and lowering the position of the blades 12 in the container.

By this arrangement the blades 12 act on the product throughout the body of the container and a satisfactory blending operation takes place. The extent of the reciprocal movement depends upon the nature of product being blended. It can be for the full height of the container or over a limited height. The drive may be programmed to give variable speed, direction of rotation, torque and rate of reciprocation. It may also be torque limited, have variable blending duration and have a cutout if torque levels are exceeded or if temperature level of the product is wrong.

After blending blended product within the container may be accessed through an opening 23 in the lid using a straw (not shown). The opening 23 may be sealed by a seal or may be a weakened area of the lid which may be punched through by entry of the straw. Alternatively the lid may be removable from the body 3, with the element 7. The opening 23 may be located under the seal 14 to be opened when the seal 14 is removed.

Instead of the described blending element 7, as shown, there may be provided blades 12 at various positions along the shaft 8. This may be by having a spirally-arranged array of blades 12 along the shaft 8, by having axially spaced blades 12 along the shaft 8 or by other arrangements of blades whereby blending is effected over the height of the container by the location of blades at different positions within the height of the container. With this arrangement the reciprocal movement of the blending element 7 may be found not to be necessary.

Instead of a blending arrangement in which the blending element moves up and down relative to the container, the position of the element may be fixed and the container moves up and down relative to the element on a reciprocal base.

Instead of the container having a circular cross-section it may be of other shapes, preferably shapes which provide for nestability of empty containers.

The opening in the lid of the container may be sealed after blending by applying into the opening a closure member which is a close fit into the opening and lies flush with the lid surface.

In other respects the blending apparatus, the method of its use and the construction of the components may be as described in earlier patent specification PCT/GB98/03193.

What is claimed is:

1. A method of blending a food product in a container comprising the steps of:

charging the container with the food product through an opening at an upper end of the container;

closing the opening by a closure member having blender access means;

transporting the container with the product charged therein to a blending location;

slidably extending a blender through the access means into the food product in the container;

coupling the blender and the closure member to one another;

drivingly connecting the blender coupled to the closure member to a blender drive means for rotation of the blender;

actuating the drive means to rotate the blender, thereby blending the food product in the container;

moving the blender up and down relative to the container during blending; and after blending, removing the product from the container for consumption through said upper opening.

2. A method according to claim 1 including locating the blender through the blender access means prior to blending.

3. A method according to claim 1 wherein the blender includes a shaft and a blending element at the lower end of the shaft.

4. A method according to claim 3 wherein the blending access means includes an opening through which the blender is slidably received, and including the step of folding the blending element relative to the shaft, enabling the blending element to pass through the blender access means prior to blending.

5. A method according to claim 1 including coupling the closure member and the blender with the container after charging the container with the food product.

6. A food blending apparatus comprising:

a container having an upper opening for admitting food product into the container;

a closure member for the upper opening;

blending means for blending products within the container and being drivingly connectable to a drive means;

said blending means being coupled with the closure member and extending downwardly into the container from said closure member toward the opposite end of the container;

the blending means including a shaft rotatable about an axis and having connection means for releasably connecting the drive means for driving engagement with the shaft, the shaft carrying a blending element for blending product in the container upon rotation of the shaft, the shaft and blending element being reciprocally movable in the axial direction relative to the container and to the closure member.

7. Apparatus according to claim 6 wherein the blending element is carried by said shaft adjacent a lower end of the shaft.

8. Apparatus according to claim 6 wherein the blending element includes a plurality of blades located along the shaft spaced from a lower end thereof and spaced along the shaft.

9. Apparatus according to claim 6 wherein the drive means connected to the blending means is reciprocally movable in the axial direction and transmits the axial reciprocal movement thereof to the blending means.

10. Apparatus according to claim 6 wherein the closure member includes a central aperture for receiving the shaft and a bearing means between the shaft and said aperture.

11. Apparatus according to claim 6 including a releasable connecting means for connecting the drive means and the shaft.

12. Apparatus according to claim 6 wherein the drive means includes an expandable portion located within a central opening in the shaft, the driving connection between the drive means and the shaft being made by expanding said portion into engagement with the walls of said opening.

13. Apparatus according to claim 6 comprising a seal about an opening in the closure member through which the blending means passes prior to blending.

14. Apparatus according to claim 13 comprising a further opening in the closure member for accessing the food product after blending.

15. A container for use in a food blending apparatus comprising:

an upper opening for admitting food product into the container;

a closure for the upper opening;

blending means for blending product within the container and drivingly connectable to external drive means;

the blending means being coupled with the closure member and extending downwardly into the container from said closure member toward the opposite end of the container;

the blending means including a rotatable shaft having connection means for releasably connecting the drive means with the shaft;

the shaft carrying a blending element for blending the food product in the container during rotation of the shaft; and the blending means being slidable relative to the closure member to enable the shaft to move up and down within the container.

* * * * *